United States Patent
Kobayashi et al.

(10) Patent No.: US 7,264,409 B2
(45) Date of Patent: Sep. 4, 2007

(54) CONTAINER ASSEMBLY FOR LASER DIODE MODULE

(75) Inventors: Kazunori Kobayashi, Saitama (JP); Toshihiro Hosoya, Saitama (JP)

(73) Assignee: Yagi Anntena Inc., Saitama (JP)

( * ) Notice: Subject to any disclaimer, the term of this patent is extended or adjusted under 35 U.S.C. 154(b) by 110 days.

(21) Appl. No.: 11/191,073

(22) Filed: Jul. 28, 2005

(65) Prior Publication Data
US 2006/0024006 A1    Feb. 2, 2006

(30) Foreign Application Priority Data
Jul. 28, 2004    (JP) .......................... P2004-219705
Jun. 28, 2005    (JP) .......................... P2005-187989

(51) Int. Cl.
G02B 6/36    (2006.01)
H01S 3/04    (2006.01)

(52) U.S. Cl. .............................. 385/94; 385/88; 372/34

(58) Field of Classification Search ..................... None
See application file for complete search history.

(56) References Cited

U.S. PATENT DOCUMENTS 5,195,102 A  *  3/1993  McLean et al. ............... 372/34
5,197,076 A  *  3/1993  Davis et al. .................. 372/34
2002/0031150 A1 *  3/2002  Aikiyo et al. ................. 372/36

FOREIGN PATENT DOCUMENTS

JP           5-90698 A      4/1993
JP        2003-142766 A     5/2003

* cited by examiner

*Primary Examiner*—Rodney Bovernick
*Assistant Examiner*—Omar Rojas
(74) *Attorney, Agent, or Firm*—Sughrue Mion, PLLC

(57) ABSTRACT

In a container assembly for a laser diode module in which a temperature control device is not incorporated in advance, a heat-insulative casing is adapted to accommodate the laser diode module. A temperature detector is accommodated in the casing. A thermal coupling member is accommodated in the casing so as to thermally couple the laser diode module and the temperature detector. A heat-conductive plate member is attached to the casing. A heat transfer element is interposed between the thermal coupling member and the plate member so as to allow heat transfer therebetween. A sealing member is disposed between the casing and the plate member so as to seal the heat transfer element. A heat transfer controller causes the heat transfer element to control the heat transfer in accordance with a temperature of the thermal coupling member which is detected by the temperature detector.

6 Claims, 6 Drawing Sheets

CONTAINER ASSEMBLY FOR LASER DIODE MODULE

BACKGROUND OF THE INVENTION

The present invention relates to a container for a laser diode module capable of performing a temperature control.

For example, Japanese Patent Publication Nos. 5-90698A and 2003-142766A disclose laser diode modules that perform a temperature control. However, each of the laser diode modules disclosed in these documents is complex in structure, difficult to manufacture, and expensive because a temperature controlling device is incorporated in the laser diode module in advance.

SUMMARY OF THE INVENTION

It is therefore an object of the invention to provide a module container assembly that is easy to manufacture, inexpensive, and capable of performing an effective temperature control on an uncooled laser diode module (i.e., no temperature control device is incorporated in advance).

In order to achieve the above object, according to the invention, there is provided a container assembly for a laser diode module in which a temperature control device is not incorporated in advance, comprising:

a heat-insulative casing, adapted to accommodate the laser diode module;

a temperature detector, accommodated in the casing;

a thermal coupling member, accommodated in the casing so as to thermally couple the laser diode module and the temperature detector;

a heat-conductive plate member, attached to the casing;

a heat transfer element, interposed between the thermal coupling member and the plate member so as to allow heat transfer therebetween;

a sealing member, disposed between the casing and the plate member so as to seal the heat transfer element; and a heat transfer controller, causing the heat transfer element to control the heat transfer in accordance with a temperature of the thermal coupling member which is detected by the temperature detector.

Preferably, the container assembly further comprises: an optical fiber, adapted to lead light emitted from the laser diode module; and a board, on which the laser diode module is mounted. The casing is formed with a first opening closed by the optical fiber, a second opening closed by the board, and a third opening adapted to receive the heat transfer element and closed by the sealing member and the plate member.

Here, it is preferable that: a gap between the optical fiber and the first opening is filled with an adhesive; and a gap between the board and the second opening is filled with an adhesive.

Preferably, the temperature detector is a thermistor configured to vary a resistance value thereof in accordance with the temperature of the thermal coupling member. The heat transfer element is a Peltier element operable to change a direction of the heat transfer in accordance with a current inputted thereto. The heat transfer controller control the current so as to keep the resistance value constant.

With the above configurations, it is easy to manufacture and capable of performing an effective temperature control on the uncooled laser diode module.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the invention will be described below in detail with reference to the accompanying drawings.

Figure 1:
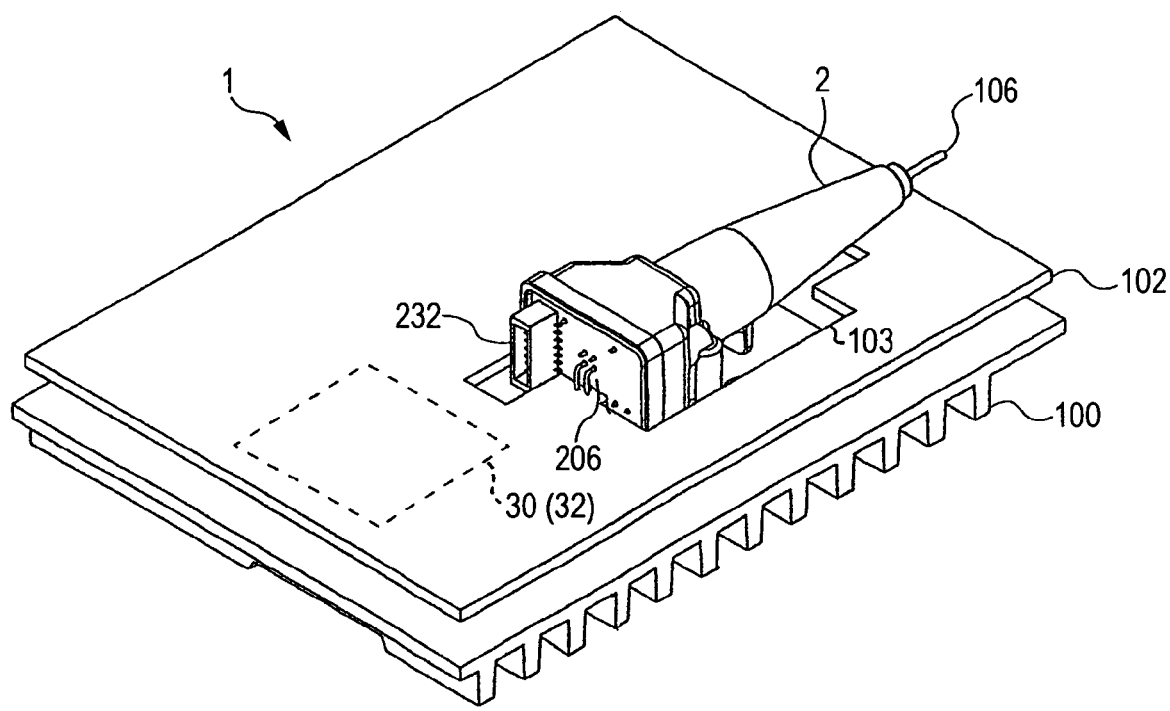
FIG. 1 is a perspective view of a laser transmission unit incorporating a laser diode module according to one embodiment of the invention.

As shown in FIG. 1, according to one embodiment of the invention, a laser transmission unit 1 comprises: a module container assembly 2; a heat sink 100; and a main board 102 including a driving circuit 30 and a temperature control circuit 32 for a laser diode module 200 (both are indicated by dashed lines) and other components.

Figure 2:
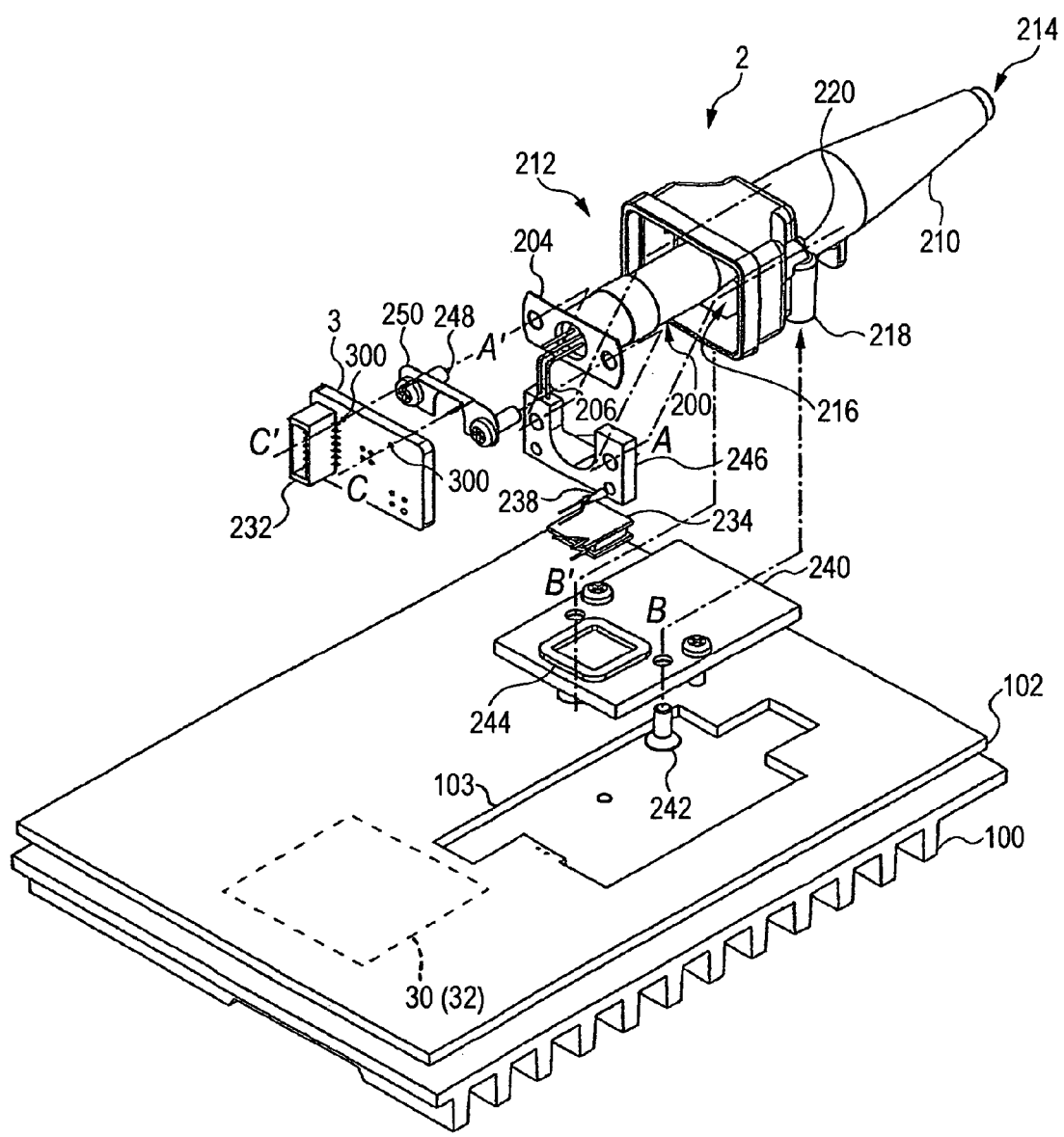
FIG. 2 is a perspective view showing a disassembled state of the laser transmission unit.
Figure 3:
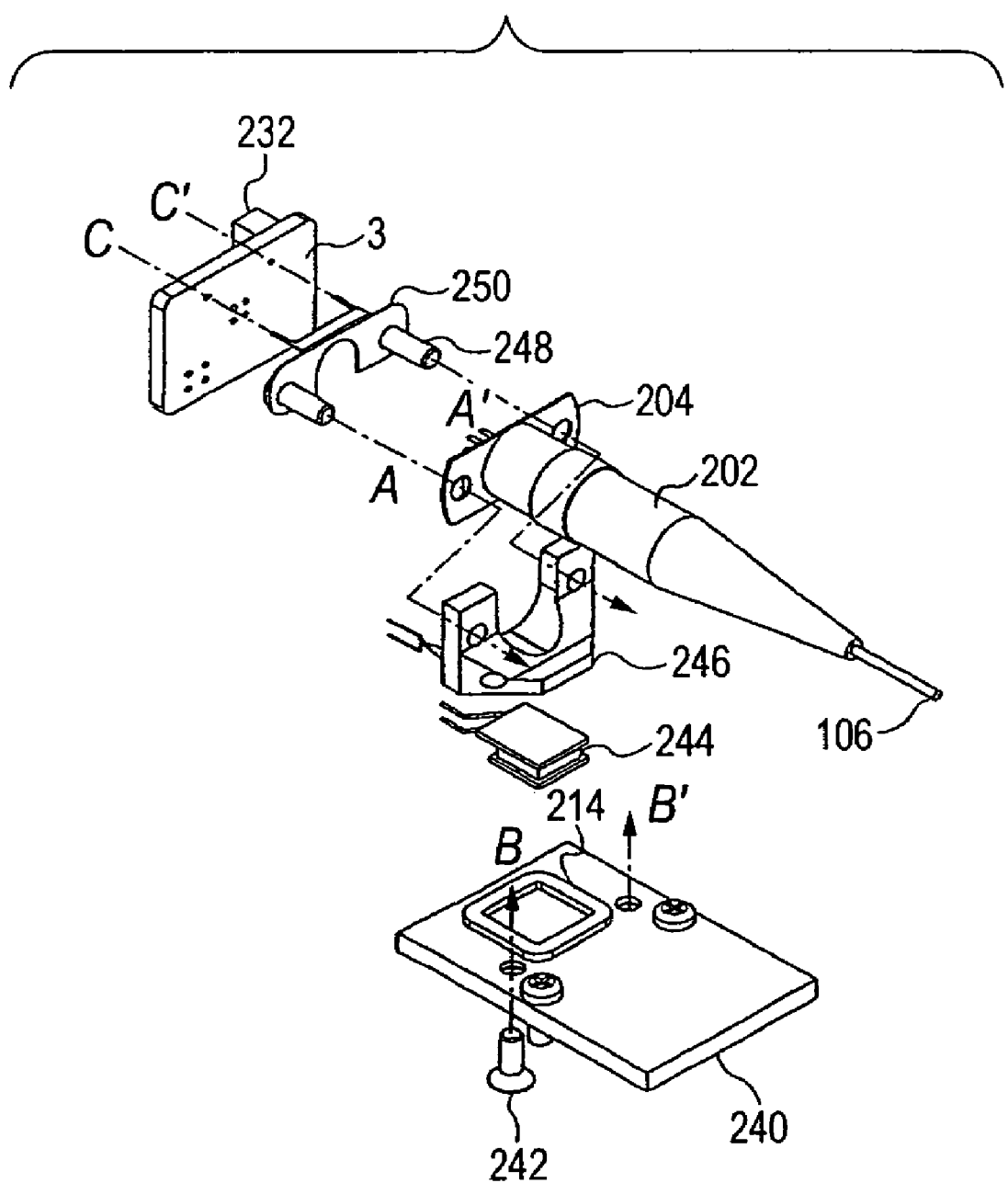
FIG. 3 is a perspective view showing a disassembled state of the laser diode module.
Figure 4A:
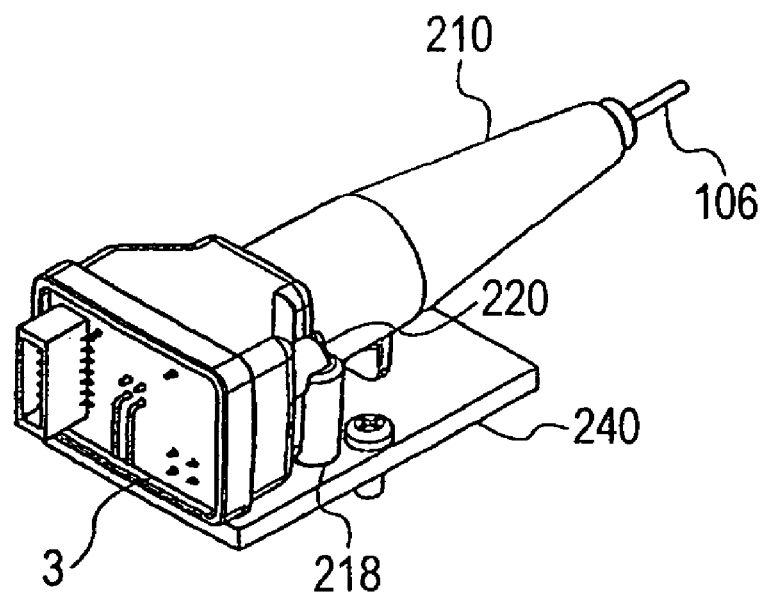
FIG. 4A is a rear perspective view of a module container assembly incorporating the laser diode module.
Figure 4B:
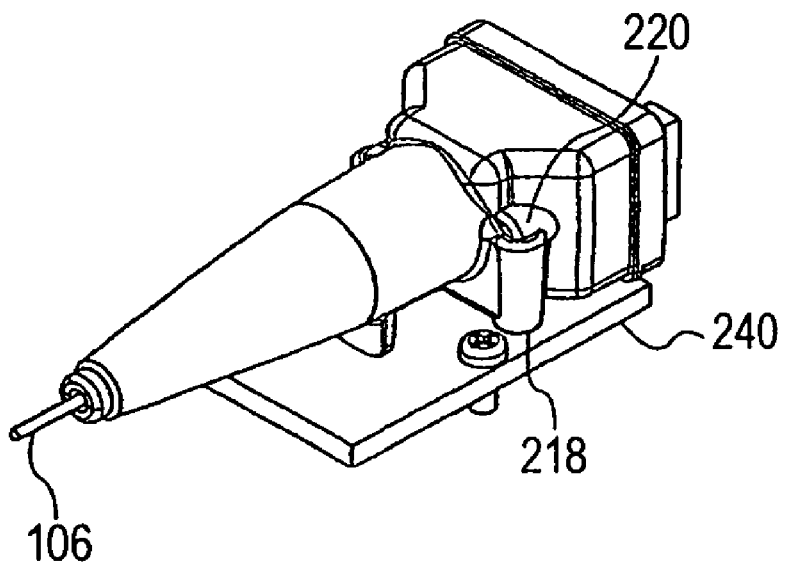
FIG. 4B is a front perspective view of the module container assembly.
Figure 5A:
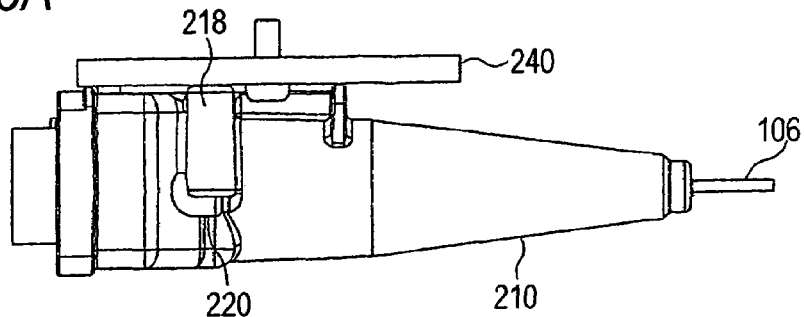
FIG. 5A is a top plan view of the module container assembly.
Figure 5B:
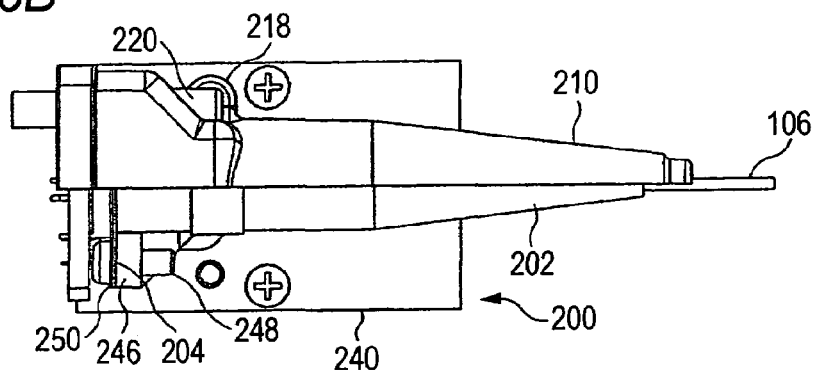
FIG. 5B is a partially sectional side view of the module container assembly.
Figure 5C:
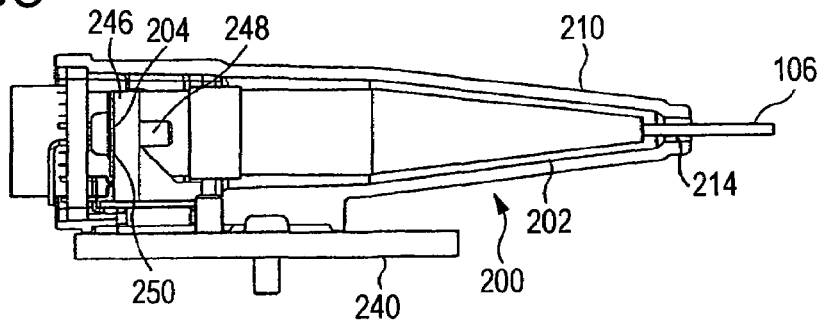
FIG. 5C is a partially sectional bottom plan view of the module container assembly.
Figure 5D:
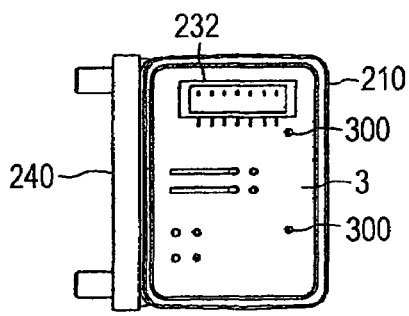
FIG. 5D is a rear view of the module container assembly.
Figure 5E:
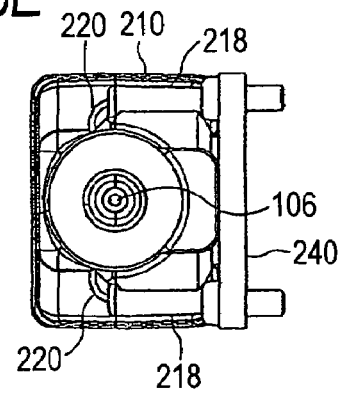
FIG. 5E is a front view of the module container assembly.

As shown in FIGS. 2 and 3, the module container assembly comprises: a module board 3 having a connector 232; a Peltier element 234; a heat-insulative casing 210; a thermistor 238; a heat-conductive plate 240; flat head screws 242; a moisture-proof packing 244; a module mount 246; pan head screws 248; and grounding member 250.

The laser diode module 200 comprises a sleeve 202 and a conductive flange 204. The heat-insulative casing 210 is formed with a first opening 214, a second opening 212, a third opening 216, first screw receiving portions 218 that have threaded holes and receive the flat head screws 242, and second screw receiving portions 220 that likewise receive the pan head screws 248.

The heat sink 100 and ground patterns provided on the module board 3 and the main board 102 are connected to a ground for radio frequency signals (not shown).

Using the above components, the laser transmission unit 1 converts, to an optical signal (laser light beam), a transmission signal that is input from the main board 102 and sends out the optical signal to the optical fiber 106 while performing a temperature control on the laser diode module 200.

As indicated by chain lines A and A', the grounding member 250, the module mount 246, and the conductive flange 204 of the laser diode module 200 are together fastened to the second screw receiving portions 220 of the heat-insulative casing 210 with the pan head screws 248. These components are thus housed in and fixed to the heat-insulative casing 210.

The Peltier element 234 is surrounded by the moisture-proof packing 244 and received by the heat-insulative casing 210 through the third opening 216. And the Peltier element 234 is housed in the heat-insulative casing 210 so as to be interposed between the bottom face of the module mount 246 and the heat-conductive plate 240.

As indicated by chain lines B and B', when the heat-conductive plate 240 is fixed to the first-screw receiving portions 218 of the heat-insulative casing 210 with the flat head screws 242, the Peltier element 234 is sealed in by the moisture-proof packing 244, the heat-insulative casing 210, and the heat-conductive plate 240. The Peltier element 234 and the module mount 246 are pressed against each other and are thereby thermally coupled to each other.

If the flange 204 of the laser diode module 200 were separated from the ground for radio frequency signals, the operation characteristics of the laser diode module 200 might deteriorate. In view of this, as indicated by chain lines C and C', projections of the grounding member 250 are inserted in and soldered to grounding holes 300 of the module board 3 and are thereby connected to a ground for radio frequency signals provided on the module board 3.

In this manner, the flange 204 is grounded via the grounding member 250, the module board 3, the main board 102, and the heat sink 100, whereby the operation characteristics of the laser diode module 200 are kept good.

The external appearance of the module container assembly 2 with the above components combined together is as shown in FIGS. 1 and 4A through 5E.

Figure 6:
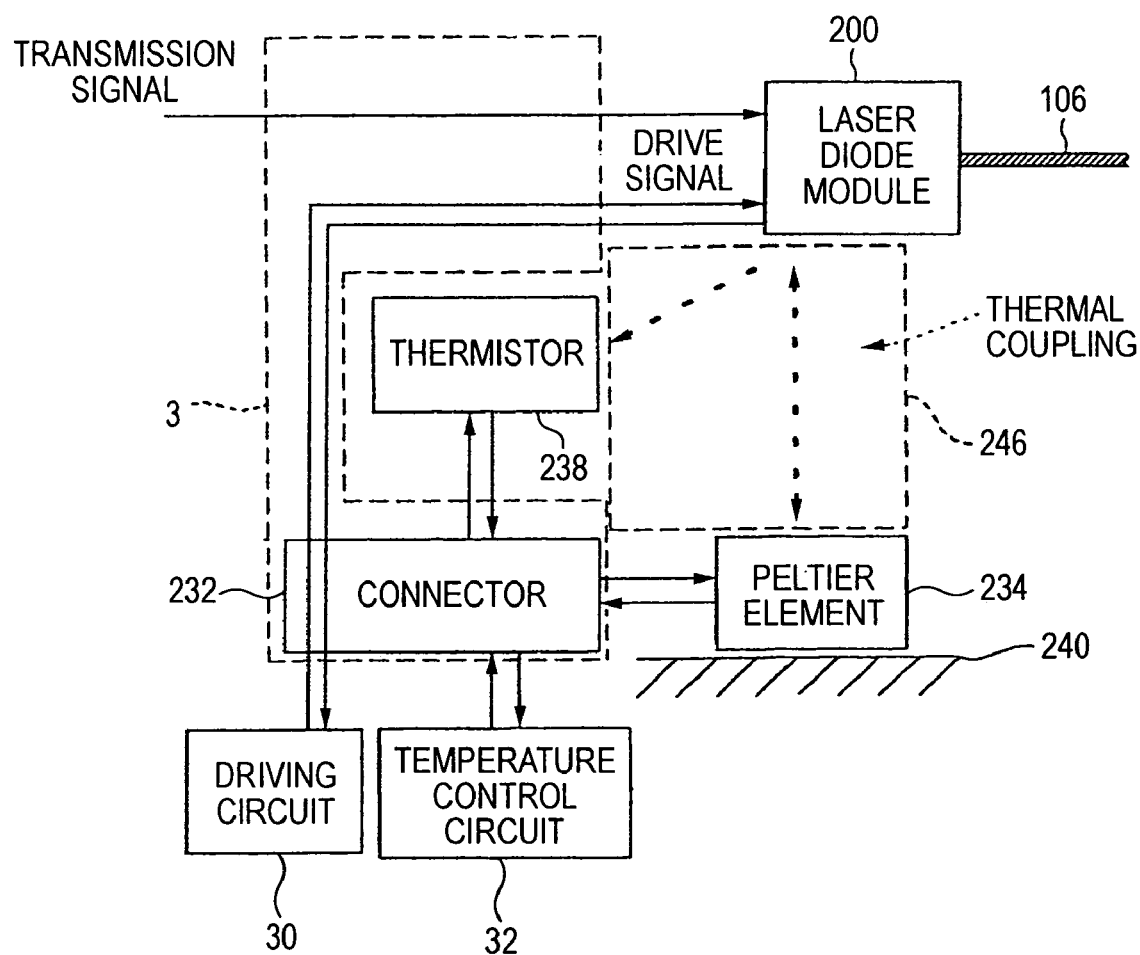
FIG. 6 is a block diagram showing the schematic configuration of the laser transmission unit.

As shown in FIG. 6, a transmission signal that is input from the main board 102 is input to the laser diode module 200 via the grounded module board 3.

Inputting a transmission signal to the laser diode module 200 via the module board 3 in this manner makes it possible to provide more stable characteristics for radio frequency signals than in a case that a transmission signal is directly input from the main board 102.

The temperature control circuit 32 and the driving circuit 30 on the main board 102 are connected to the thermistor 238 via the connector 232.

The heat-insulative casing 210 is made of a material that is high in heat insulation characteristics (e.g., ABS). The inside of the heat-insulative casing 210 has such a shape that an air layer is formed between the casing and the components such as the laser diode module 200 housed therein and those components are thermally insulated from the outside.

The heat-insulative casing 210 is formed with the first opening 214 through which the optical fiber 106 is inserted, the second opening 212 through which the laser diode module 200 etc. are inserted, and the third opening 216 through which the Peltier element 234 is received to bring it into contact with the bottom face of the module mount 246.

One end of the optical fiber 106 is introduced through the first opening 214 to such a position as to come into contact with a light output window (not shown) of the metal casing of the laser diode module 200 housed in the heat-insulative casing 210 and to be able to receive laser light that is output from the laser diode module 200.

An adhesive fills the gap in the first opening 214 that is formed between the heat-insulative casing 210 and the optical fiber 108 whose one end portion is introduced in the heat-insulative casing 210, whereby the heat-insulative casing 210 is sealed.

The heat-insulative casing 210 may be plated with a metal. Where the heat-insulative casing 210 is plated with a metal and the plating portion is grounded, the laser diode module 200 housed inside is shielded and hence its operation characteristics are kept good.

Further, if the metal plating gives the heat-insulative casing 210 a metallic luster, its emissivity comes close to 1 and the heat insulation characteristics are improved.

An electrode 206 of the laser diode module 200 is attached to the module board 3 and the main board 102 (see FIG. 1), which allows input of a radio frequency signal from the main board 102 to the laser diode module 200.

The module mount 246, which is inserted between the laser diode module 200 and the Peltier element 234, is made of a material that is high in thermal conductivity (e.g., pure copper) and connects the laser diode module 200 and the Peltier element 234 with good thermal coupling.

The thermistor 238 is attached to the module mount 246, and the thermistor 238 and the laser diode module 200 are thermally coupled to each other via the module mount 246.

The heat-conductive plate 240 made of a material having high thermal conductivity (e.g., pure copper) is attached to the heat sink 100 through an opening 103 of the main board 102, whereby the heat sink 100 and the heat-conductive plate 240 are thermally coupled to each other. If necessary, electrical conduction between them is further secured.

As described above, the first opening 214 of the heat-insulative casing 210 is sealed with the optical fiber 106 and the adhesive and its third opening 216 is sealed with the moisture-proof packing 244 and the heat-conductive plate 240.

Likewise, the module board 3 is put in the second opening 212 of the heat-insulative casing 210 and fixed to the heat-insulative casing 210 with an adhesive or the like, whereby the second opening 212 is sealed with the module board 3 and the adhesive.

All the openings of the heat-insulative casing 210 are sealed in this manner, whereby the heat insulation characteristics of the inside of the heat-insulative casing 210 are kept good. Further, since the inside of the heat-insulative casing 210 is isolated from the external air, the internal components are not deteriorated by external moisture and condensation of leakage moisture does not occur.

In the laser transmission unit 1 having the above structure, the components housed in the heat-insulative casing 210 are thermally insulated from the outside except via the Peltier element 234 and the laser diode module 200, the thermistor 238, the Peltier element 234, the heat-conductive plate 240, and the heat sink 100 are thermally coupled together.

Further, electrical conduction is secured between the laser diode module 200, the grounding member 250, the ground patterns (not shown) on the module board 3 and the main board 102, the heat-conductive plate 240, and the heat sink 100.

The temperature control of the module container assembly 2 will be described below with reference to FIG. 6.

The Peltier element 234 transfers heat from the heat sink 100 to the module mount 246 and the laser diode module 200 or vice versa in accordance with the direction and the value of a current that is supplied from the temperature control circuit 32.

The resistance of the thermistor 238, which is thermally coupled to the laser diode module 200, varies with a temperature variation of the laser diode module 200. Therefore, if the voltage applied to the thermistor 238 is constant its current value varies with a temperature variation of the laser diode module 200.

The temperature control circuit 32, which is connected to the thermistor 238 via the connector 232, detects the value of the current flowing through the thermistor 238 (i.e., the resistance of the thermistor 238), and controls the direction and the value of the current supplied to the Peltier element 234 so that the detected current value (i.e., resistance) is always kept constant. In this manner, the temperature control circuit 32 keeps the temperature of the laser diode module 200 almost constant.

More specifically, if the value of the current flowing through the thermistor 238 is smaller than a reference value, the temperature control circuit 32 transfers heat from the laser diode module 200 to the heat sink 100, that is, cools the laser diode module 200.

Conversely, if the value of the current flowing through the thermistor 238 is larger than the reference value, the temperature control circuit 32 transfers heat from the heat sink 100 to the laser diode module 200, that is, heats the laser diode module 200.

Since the temperature control circuit 32 always keeps the temperature of the laser diode module 200 constant, the characteristics of the laser diode module 200 are kept almost constant irrespective of the ambient temperature of the laser transmission unit 1.

Since the temperature control circuit 32 always keeps the temperature of the laser diode module 200 constant, the characteristics of the laser diode module 200 do not vary and are always kept good.

Although laser diode modules are available whose temperature characteristics are kept good because of incorporation of a Peltier element, they are generally expensive as described the above.

In contrast, the laser diode module 200 used in the laser transmission unit 1 does not incorporate a Peltier element in advance and hence is inexpensive. However, since the temperature control is performed by using the Peltier element 234 that is thermally coupled to the laser diode module 200, the laser transmission unit 1 is given temperature characteristics that are equivalent to or better than those as would be obtained when an laser diode module incorporating a Peltier element is used.

In the laser transmission unit 1, the laser diode module 200 and the Peltier element 234 are thermally coupled to each other closely via the module mount 246, the Peltier element 234 can be of a small size and of low power consumption.

Since the laser diode module 200 is grounded via the grounding member 250 etc., whereas its characteristics are kept high it is thermally insulated from the outside except via the module mount 246. As a result, the temperature control can be performed efficiently.

Further, since the heat-insulative casing 210 is sealed, the laser diode module 200 is free of trouble due to condensation of moisture leaking into the heat-insulative casing 210.

Still further, the components (laser diode module 200, module mount 246, etc.) of the laser transmission unit 1 are small and can be manufactured as general-purpose modules that can easily be attached and detached.

Therefore, even if the laser transmission unit 1 has many types of products, the same parts can be used in the many types of products and the many types of products can be manufactured at low costs.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A container assembly for a laser diode module in which a temperature control device is not incorporated in advance, comprising:
    a heat-insulative casing, adapted to accommodate the laser diode module;
    a temperature detector, accommodated in the casing;
    a thermal coupling member, accommodated in the casing so as to thermally couple the laser diode module and the temperature detector;
    a heat-conductive plate member, attached to the casing;
    a heat transfer element, interposed between the thermal coupling member and the plate member so as to allow heat transfer therebetween;
    a sealing member, disposed between the casing and the plate member so as to seal the heat transfer element;
    a heat transfer controller, causing the heat transfer element to control the heat transfer in accordance with a temperature of the thermal coupling member which is detected by the temperature detector; and
    an optical fiber, adapted to lead light emitted from the laser diode module; and
    a board, on which the laser diode module is mounted,
    wherein the casing is formed with a first opening closed by the optical fiber, a second opening closed by the board, and a third opening adapted to receive the heat transfer element and closed by the sealing member and the plate member.

2. The container assembly as set forth in claim 1, wherein:
    the temperature detector is a thermistor configured to vary a resistance value thereof in accordance with the temperature of the thermal coupling member;
    the heat transfer element is a Peltier element operable to change a direction of the heat transfer in accordance with a current inputted thereto; and
    the heat transfer controller controls the current so as to keep the resistance value constant.

3. The container assembly as set forth in claim 1, wherein a gap between the optical fiber and the first opening is filled with an adhesive.

4. The container assembly as set forth in claim 1, wherein a gap between the board and the second opening is filled with an adhesive.

5. The container assembly as set forth in claim 1, wherein at least a part of the heat-insulative casing is plated with a metal.

6. The container assembly as set forth in claim 5, wherein the at least the part of the heat-insulative casing which is plated with the metal is grounded.

* * * * *